May 15, 1934. O. C. GILMORE 1,958,618
MOUNTING FOR COLOR FILTERS
Filed Jan. 25, 1932
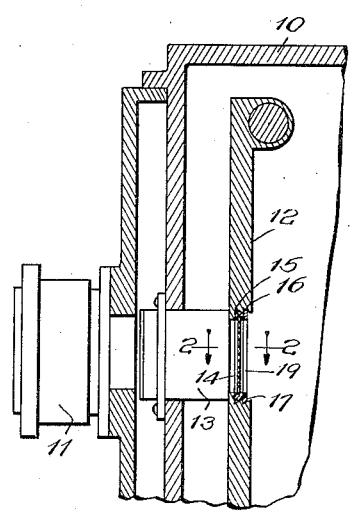
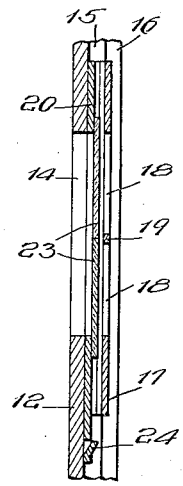
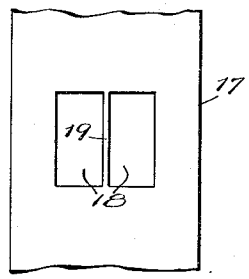
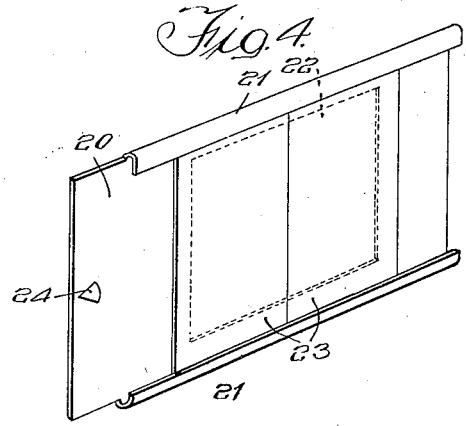
Witness:
William P. Kilroy
Inventor:
Otto C. Gilmore
By John E. Gardner
Atty Patented May 15, 1934

1,958,618

UNITED STATES PATENT OFFICE 1,958,618

MOUNTING FOR COLOR FILTERS

Otto C. Gilmore, Los Angeles, Calif., assignor to Cinemacolor Corporation, Chicago, Ill., a corporation of Delaware Application January 25, 1932, Serial No. 588,655

3 Claims. (Cl. 88—16.4)

This invention relates to color photography generally and particularly to the mounting of separate and distinct color filters in the camera for the creation of a plurality of individual and separate photographic color records.

It is the object of this invention to provide a mounting for the color filters which may readily convert a standard camera into one of the production of color record negatives.

With the above and other objects in view, as will be apparent, this invention consists in the construction, combination and arrangement of parts, all as hereinafter more fully described, claimed and illustrated in the accompanying drawing wherein:

Fig. 1 is a vertical section through the film gate of a standard motion picture camera illustrating the present invention in conjunction therewith:

Fig. 2 is a horizontal section taken along line 2—2 of Fig. 1;

Fig. 3 is an elevation of the aperture of mat plate used in conjunction with the present invention and co-acting with the film gate of the camera; and Fig. 4 is a perspective view of the color filter holder.

While the present invention is of general application and use in color photography, it is particularly designed for use in the production of motion pictures in natural colors and will be so described. To produce motion pictures in natural colors, and also still pictures in natural colors, it is necessary to create two or more identical images each of which represents or constitutes an individual color record, e. g. one image being a red-orange record and the other a blue-green record. These individual color records are obtained by passing the rays carrying the several images through appropriate filters, i. e., the rays of one image through a red-orange filter and the rays of the other through a blue-green filter. The present invention relates to the mounting of such filters in a standard camera and does not especially relate to the creation of the plurality of identical images or to the camera or to the means used for that purpose. It is the purpose of the present invention to convert a standard camera designed for the production of black and white pictures into a camera for the production of motion pictures in natural colors without in any way altering the mechanical make up of such camera so that the camera may be quickly and easily reconverted for use in conjunction with the production of motion pictures in black and white.

Reference being had more particularly to the drawing, 10 designates the case of a standard motion picture camera, carrying a suitable lense set 11, and a camera gate 12.

Interposed between the lens set 11 and the aperture 14 of the camera gate 12 is an image splitting device 13 of any suitable construction, which device divides the rays of light projected through the lens set 11 into the interior of the camera into two or more separate and distinct paths of light, each path carrying a complete image and the image of one path being the duplicate of the images of all other paths.

In standard motion picture cameras such as that shown in the drawing, the edges of the aperture 14 of the camera gate 12 is usually provided with parallel dove-tail grooves 15 and 16, or other equivalent features, in which the aperture plate or mat of the camera is mounted. Of course, in the production of what may be termed black and white motion pictures the aperture plate so mounted in the camera gate contains but a single aperture of the desired size. In the present invention an aperture plate 17 is inserted in the slots or grooves 16 in lieu of the usual single opening aperture plate normal therein. This aperture plate 17 has two or more apertures 18 therein separated one from the other by the divider or partition 19. Thus a single aperture 18 is provided in the aperture plate 17 for each path of light or image created by the image splitting device 13.

Between the aperture plate 17 and the image splitting device 13 is mounted the filter holder 20. This holder 20 comprises a sheet of relatively thin metal having its edges 21 rebent inwardly to rest parallel to the body of the plate. An aperture 22 is formed centrally of the plate 20 and is covered by the color filters 23. These color filters 23 are inserted in the grooves created by the edges 21 of the plate 20 and are positioned over the aperture 22, one color filter being provided for each image created by the image splitting device 13 and for each opening 18 in the aperture plate 17. The body of the plate 20 is provided with a teat 24 bent upwardly and formed from the plate for the manipulation of the same.

This filter holder 20 is inserted in the grooves 15 of the aperture 14 of the camera gate 12 and may be manipulated and adjusted until the filters 23 are properly positioned with respect to the light paths created by the image splitting device 13 and the openings 18 of the aperture plate 17.

In practice the standard or normal aperture plate of the camera may be removed from the opening 14 of the camera gate 12 and the filter holder 20 and co-active aperture plate 17 may be readily inserted in the opening 14 of the camera gate 12. When it is desired to reconvert the camera for the production of black and white pictures the holder 20 and aperture plate 17 may be removed and the standard or normal aperture plate of the camera reinserted in the opening 14.

It is, of course, to be understood that other adjustments are necessary for the complete conversion of the camera for the production of motion pictures in color, but as these adjustments and attachments have nothing to do with the present invention they will not be here described.

It is to be understood that while the present invention has been described in conjunction with two images it can be readily applied to a greater number of images without departing from the principles thereof.

What is claimed is:

1. The combination with a standard motion picture camera including a gate having an aperture therein, of a multiple opening aperture plate removably mounted in said gate aperture, a filter holder removably mounted in said aperture in co-operation with the aperture plate aforesaid, and a plurality of individual filters carried by said holder, each of said filters to be aligned by said holders with one of the apertures of said plate.

2. The combination with the gate of a motion picture camera having an aperture therein, of means for converting said gate for the simultaneous production of photographic color records, comprising a filter holder, a plurality of color filters carried thereby, and an aperture plate having an independent opening for cooperation with filter, all removably positioned in the aperture aforesaid.

3. The combination with the gate of a camera, having an aperture therein, of means for converting said gate for the simultaneous production of complementary photographic color records, comprising a filter holder, a plurality of complementary color filters fixedly carried thereby, and an aperture plate having an independent opening to be aligned with each filter, said holder and plate being removably positioned across the aperture in the gate aforesaid.

OTTO C. GILMORE.